No. 675,784. Patented June 4, 1901.
C. L. R. E. MENGES.
SECONDARY BATTERY.
(Application filed Dec. 23, 1897.)
(No Model.) 2 Sheets—Sheet 1.
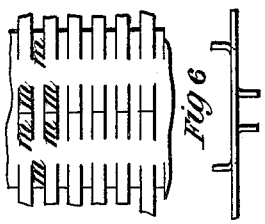
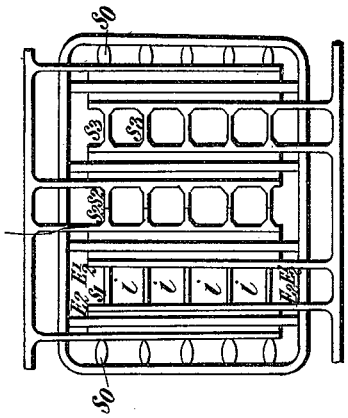
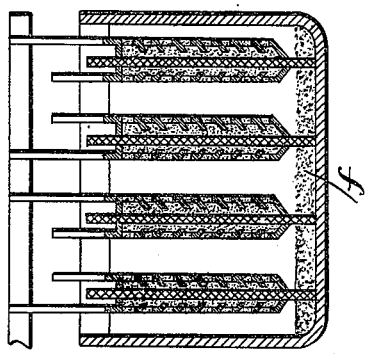
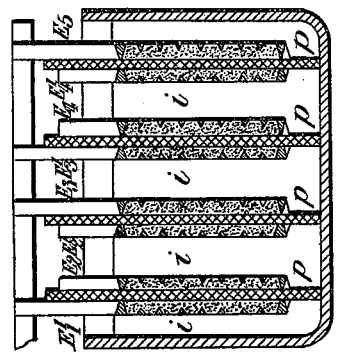
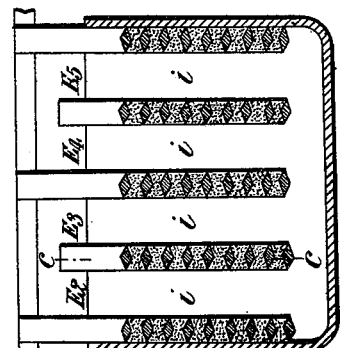
Inventor
Charles L. R. E. Menges.
By James L. Norris.
Atty.
Witnesses.

No. 675,784. Patented June 4, 1901.
C. L. R. E. MENGES.
SECONDARY BATTERY.
(Application filed Dec. 23, 1897.)
(No Model.) 2 Sheets—Sheet 2.
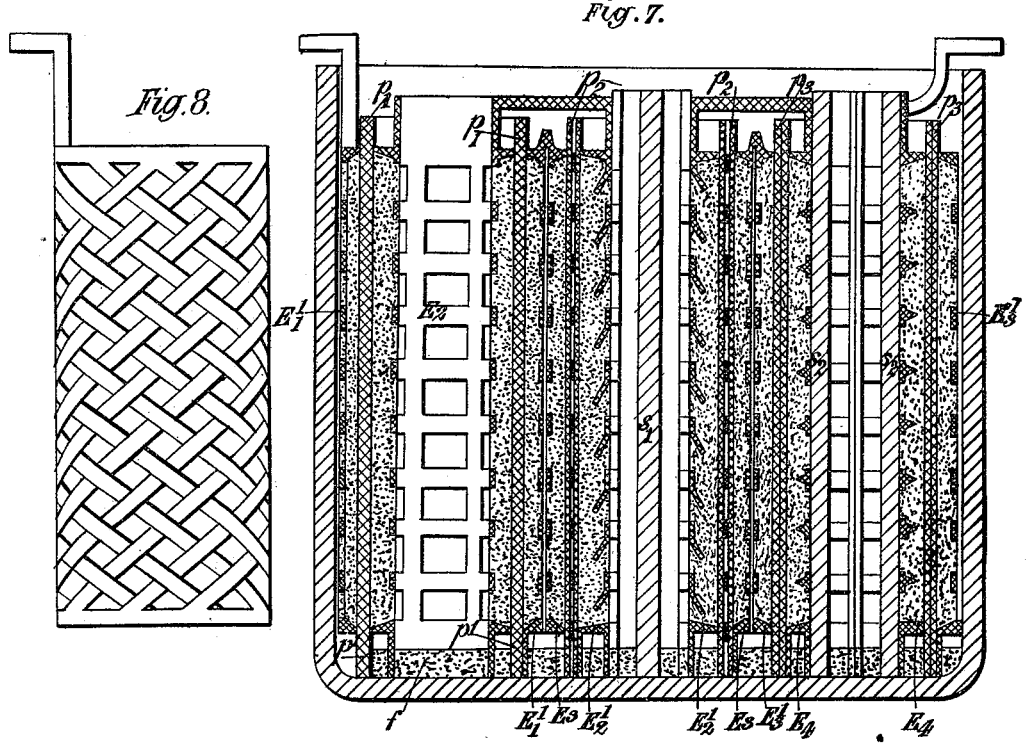
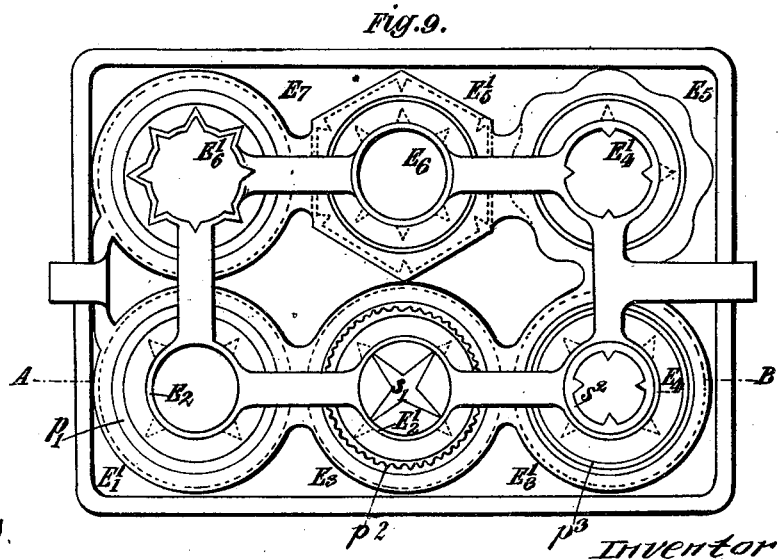
Witnesses.
W. Lee Helms.
Fred Parker
Inventor
Charles L. R. E. Menges
By James L. Norris
Atty

UNITED STATES PATENT OFFICE.

CHARLES LUDWIG RUDOLPH ERNEST MENGES, OF THE HAGUE, NETHERLANDS.

SECONDARY BATTERY.

SPECIFICATION forming part of Letters Patent No. 675,784, dated June 4, 1901.

Application filed December 23, 1897. Serial No. 663,250. (No model.)

*To all whom it may concern:*

Be it known that I, CHARLES LUDWIG RUDOLPH ERNEST MENGES, electrical engineer, a subject of the Queen of the Netherlands, residing at 82 and 84 Balistraat, The Hague, Netherlands, have invented certain new and useful Improvements in Secondary Batteries, (for which I have obtained patents in England, No. 8,905, dated May 4, 1895; in France, No. 251,428, dated November 4, 1895; in Belgium, No. 118,148, dated November 4, 1895, and in Germany, No. 83,627, dated April 20, 1895,) of which the following is a specification, reference being had to the accompanying drawings.

This invention relates to secondary batteries.

Referring to the drawings which accompany this specification, Figure 1 is a vertical section of an accumulator or storage battery wherein there are arranged a series of alternative positive and negative plates $E'$ $E^2$ $E^3$ $E^4$ $E^5$, consisting of cores or supporting frames or grids containing the exciting or active material. Now suppose each plate be divided vertically midway between its faces by a cut $c\ c$ and let the two halves be drawn apart. Then instead of there being intermediate spaces, such as $i\ i\ i$, Fig. 1, between plates of different polarity spaces will be provided between the halves or sections of the same polarity forming each plate, as indicated by Fig. 2, which is a vertical section of one form of my improved accumulator or storage battery, and in that case porous partitions, such as $p\ p$, must be inserted between the half-plates of opposite polarity to prevent direct contact between such plates. It will of course be understood that the outer halves of the first and last electrode should be omitted, as they would in any event, as well as in the arrangement shown in Fig. 1, remain inoperative.

Now an arrangement such as that illustrated in Fig. 2 affords the following advantages: A porous partition may be inserted between parts of different polarity, so that either direct contact between the differently-polarized parts or indirect contact thereof caused by pieces of the active material which may happen to crumble off may thereby be effectually prevented, and owing to the little distance intervening between the plates the electrical resistance is less than in the arrangement shown in Fig. 1. Heretofore where porous partitions have been used the free access of the liquid to the interior of the plate was considerably interfered with; but such access is, on the contrary, facilitated by the improved arrangement forming the subject of this invention, because the free or exposed surface of the plate is, in the first place, exactly similar to the free surface in Fig. 1, and in addition to this the arrangement represented in Fig. 2 has the advantage that until the discharge is completed the liquid is enabled directly to meet the active portion of the material and need not first be diffused through or permeate a layer of material which has become inactive.

In constructing accumulators the method of operation is necessarily not quite the same as that which has just been described, the plates being in that case directly constructed in the manner shown in Fig. 2.

The particular form to be given to the grid is immaterial for the purposes of this invention. In fact, any suitable form of grid may be employed. The advantages afforded by battery-plates constructed in accordance with the specification of prior British Letters Patent No. 11,923 of 1887 may here be also utilized, as illustrated in Fig. 3. As in this improved arrangement only halves of plates are employed, such halves may be made by pressure—say in a rolling-mill—instead of by casting. In order to maintain the two plate-halves, such as $E^2$ and $E'^2$, (shown in the plan Fig. 4,) at the required distance from each other, suitable spacing-blocks $s'\ s'$ (which need not be made of insulating material, since they are placed between plates of the same polarity) may be used, or, as will be readily understood, the plates themselves may be formed with spacing projections $s^2\ s^2$. In fact, if preferred, the two half-plates $E^2$ and $E'^2$ may, together with the spacing-pieces $s^3\ s^3$, be formed as one undivided or integral body provided with internal channels $i\ i\ i\ i$, which should not be filled with active material, thus giving the required space for the circulation of the liquid. The spacing-blocks $s^0\ s^0$ between the first or last plate and the wall of the jar or containing vessel, Fig. 4, should be made of flexible material, such as india-rubber, or the plates when fitted together may be compressed either in pairs or all together by means of elastic bands, so as to allow for expansion, if need be, and at the same time to insure close contact under normal conditions.

Where the grid or core is made of sheet metal, the preferable course is to form the perforations required for the circulation of the fluid not by cutting pieces out of the metal, but by making small cuts horizontally and vertically in alternate rotation to form small tongues or flaps, such as $m$ $m$ $m$ in Fig. 5, bent backward or forward, as shown, for example, in the plan view, Fig. 6. By such means the double result will be obtained that while the surface will be further increased in extent (owing to the additional surfaces provided by the edges of the cut parts) facilities for turning the active material to better account will be afforded, since by the judicious arrangement of the said flaps or tongues current can be carried up to certain points which otherwise would remain idle.

It may further be pointed out that the porous partitions $p$ $p$ need not necessarily be made of such substances as asbestos, felt, or the like, which it is customary to describe as "porous," but that perforated celluloid or ebonite plates may also be used for the purposes, provided that the diameter of the perforations is not too large in comparison with the length. Again, a compound wall may be constructed, say, of asbestos and felt, which, with a view to imparting increased firmness to the whole structure, should be covered with a perforated celluloid plate.

As it is of the utmost importance to avoid contacts or short circuits between plates of different polarity over the edges of the porous partitions, it is best to make the porous partitions somewhat larger than the plates. A further guarantee against short-circuiting may be obtained by filling the spaces at the edges of the plates and the porous partitions with plaster-of-paris or other suitable material, as shown, for instance, at $f$ at the bottom of the jar in Fig. 3.

Another form of my invention I prefer in some cases is as follows: A set of plates, as shown in the original arrangement of my invention, Fig. 2, composed of two plate-halves of different polarity—for instance, $E'^1$ and $E^2$—with the inserted porous partition $p$ $p$, is bent round, so as to form a tube, as shown by the same letters in Figs. 7, 8, and 9, Fig. 7 being a vertical section through A B of the plan Fig. 9. This may be done so as to have the axis of the tube horizontal, inclined, or vertical, the last being what I generally prefer. Now it is obvious that it will in no way alter the principle of my invention if the electrodes are directly made in the shape of tubes by casting, rolling, drawing, or any other suitable process instead of being formed by bending a set of flat plates, as previously explained.

The cross-section of the tubes need not be of exactly circular shape. I generally prefer to provide them with projecting ribs and rings, (shown by the different examples in Fig. 9,) partly for increasing the surface of the electrodes and partly for increasing its strength. For the latter purpose such ribs and rings may be formed as special strengthening-pieces surrounding or supporting the electrodes at the outside or the inside. Such supporting-pieces, which instead of being formed by separate pieces I generally prefer to make as a continuous core or cover the whole length of the electrode-tube from suitable strong yet light materials, as celluloid, micanite, (a well-known substance composed, mainly, of mica,) asbestos, ebonite, or the like, may be, for instance, in the shape shown at $s'$ or in the shape of a perforated tube, as at $s^2$.

The several sets of electrode-tubes need not be separated, but may touch, for according to the principle of this invention there are none but free surfaces of the same polarity which face each other as well inside as outside the tube set. However, to keep the several sets in a regular position or to prevent them being shaken to and fro a suitable cement, such as plaster-of-paris, or a molten substance, such as paraffin, is poured in a liquid state into the accumulator-cell, so as to cover the bottom to a small height, as shown at $f$, Fig. 7. When set hard, this cement keeps the lower ends of the electrodes in position, the upper ends being held by metallic connections. These metallic connections may also be used at the lower ends of the electrodes.

If the interior of the electrical tube is sufficiently large to contain the required quantity of liquid, it may be closed at one end or both ends. Otherwise suitable openings are to be provided at the end or in the wall of the tubes. These latter holes, if made within the active material, will also improve the access of the liquid to the active material.

To provide the necessary elasticity for the expansion or contraction of the active material by the electric action and to maintain a good contact between the active material and the supporting-grid, notwithstanding the alternate expansion or contraction, the electrodes may be made undulated or polygonal or plaited, as indicated at $E^5$ or $E'^5$ or $E'^6$, or the core supporting the active material may be formed by a lattice-work of lead, lead antimonium, or other suitable metallic wire, as shown in Fig. 8, or the porous partition may be made so as to yield easily when compressed. It may, for instance, be made by a suitable tissue of asbestos or asbestos and rubber or rubber sponge, or it may be composed, as shown in Figs. 7 and 9 at $p^2$, of a central undulated core of perforated celluloid covered with asbestos, thus forming longitudinal canals between said core and cover, or a core of perforated soft rubber covered with asbestos or woven-glass thread, as indicated at $p^3$.

The porous partition may also be formed by such substances as named before mixed with plaster-of-paris, or as a connection for pieces of plaster-of-paris, or plaster-of-paris alone may be used.

Instead of making the porous partition circular in section it may be made undulated or polygonal, partly to make it more yielding and partly to obtain more equal thickness of the active material.

Having thus described my invention, what I claim is—

1. In a secondary battery, the combination of perforated electrode-plates, permeable non-conducting partitions, active materials of different polarity in contact with the opposite sides of said non-conducting partitions and with the perforated portions of said electrode-plates, means for maintaining the space for the electrolytic liquid between electrode-walls of the same polarity, and means for maintaining the active material in elastic contact with the electrode-plates and with the permeable partitions, substantially as described and for the purpose specified.

2. In a secondary battery, the combination with a permeable non-conducting partition, of active materials of different polarity in contact with the inner and outer surfaces, respectively, of said partition, and plaited extensible and retractible concentric tubular electrode-plates of opposite polarity between which the said partition and active materials are fitted, substantially as described and for the purpose specified.

3. In a secondary battery, the combination with a tubular permeable non-conducting partition of elastic expansible and retractible construction, of active materials of different polarity in contact with the inner and outer surfaces, respectively of said partition, and concentric tubular electrode-plates of opposite polarity between which the said partition and active materials are fitted, substantially as described and for the purpose specified.

4. In a secondary battery, the combination of a compound permeable non-conducting partition formed of a supporting-piece of insulating material with perforations and channels covered by a porous non-conducting substance, and active material on both sides of said partition, substantially as described.

In testimony whereof I have hereunto set my hand this 6th day of December, 1897.

CHARLES LUDWIG RUDOLPH ERNEST MENGES.

Witnesses:
H. C. J. GRITTERS,
A. J. RUELOSSE.